United States Patent

Waltho

[11] Patent Number: 5,299,938
[45] Date of Patent: Apr. 5, 1994

[54] DISPLAY APPARATUS

[76] Inventor: Barry S. Waltho, 14 Primrose Cottages, Altrincham WA14 3EL, England

[21] Appl. No.: 941,033
[22] PCT Filed: Jan. 31, 1991
[86] PCT No.: PCT/GB91/00145
   § 371 Date: Sep. 30, 1992
   § 102(e) Date: Sep. 30, 1992
[87] PCT Pub. No.: WO91/11793
   PCT Pub. Date: Aug. 8, 1991

[30] Foreign Application Priority Data

Feb. 1, 1990 [GB] United Kingdom ............... 9002232
May 31, 1990 [GB] United Kingdom ............... 9012140

[51] Int. Cl.⁵ .................................................. G09B 9/00
[52] U.S. Cl. ........................................ 434/126; 434/283
[58] Field of Search ............... 434/283, 302, 300, 126; 472/68, 67, 57; 446/267, 167

[56] References Cited

U.S. PATENT DOCUMENTS

| 2,714,260 | 8/1955 | Burckhardt | 434/283 |
| 2,752,725 | 7/1956 | Unsworth | 446/166 |
| 2,871,617 | 2/1959 | West | 446/267 X |
| 4,595,369 | 6/1986 | Downs | 434/302 |
| 4,778,430 | 10/1988 | Goldfarb et al. | 446/167 |

FOREIGN PATENT DOCUMENTS 2598471  5/1986  France .
0473583  5/1968  Switzerland .

Primary Examiner—Gene Mancene
Assistant Examiner—Jeffrey A. Smith
Attorney, Agent, or Firm—Pravel, Hewitt, Kimball & Krieger

[57] ABSTRACT

An apparatus for illustrating the operation of an Archimedes screw. Two passages (8,9) are defined which together form a single closed loop passageway. A first passage (8) is generally linear and a second passage (9) is of helical form and is connected at its ends to the ends of the first passage. The walls of the two passages are transparent such that the movement of fluid (10) can be clearly seen. The first and second passages are arranged such that if the first passage (8) is positioned at a predetermined inclination to the vertical fluid can be transferred through the second passage (9) from the lower to the upper end of the first passage by rotating the apparatus about an axis extending parallel to the length of the first passage. The second passage (9) may be in the form of a helical tube wound around the outside of a straight tube defining the first passage (8).

11 Claims, 4 Drawing Sheets

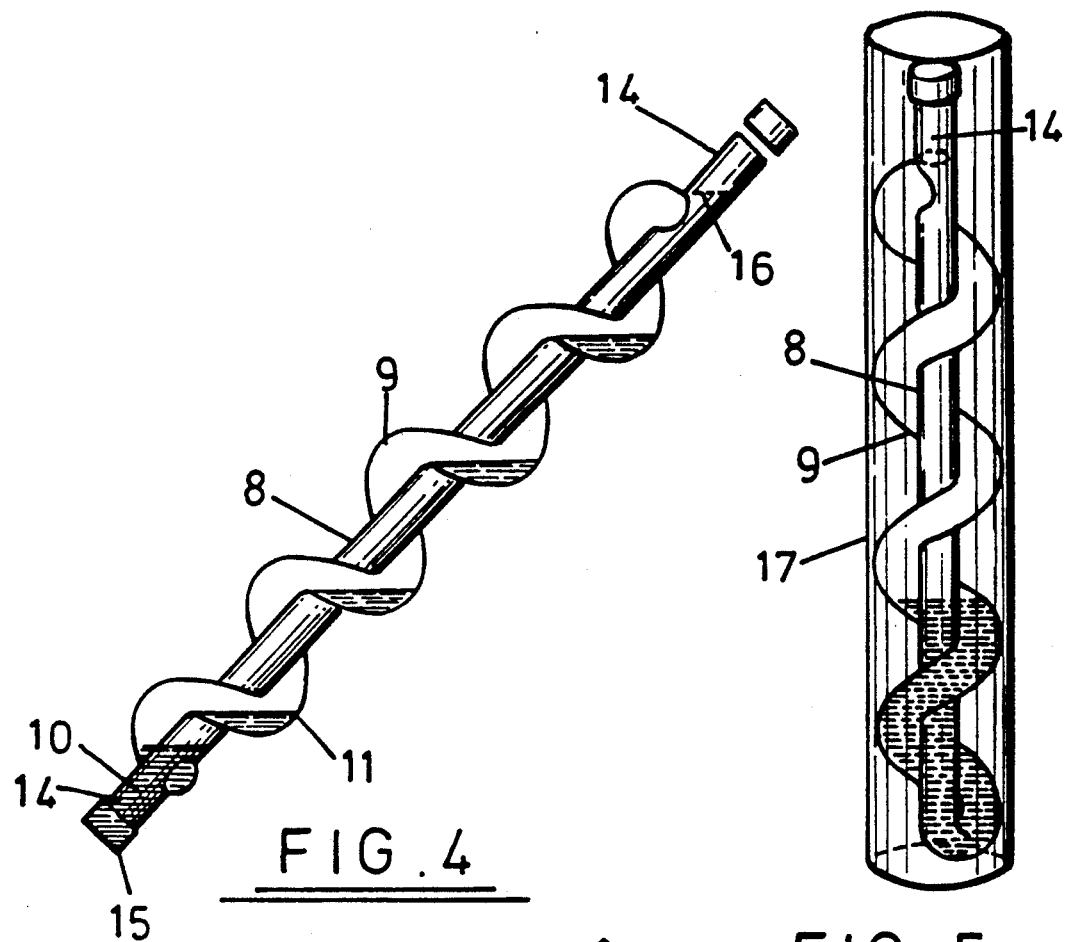
FIG.4
FIG.5
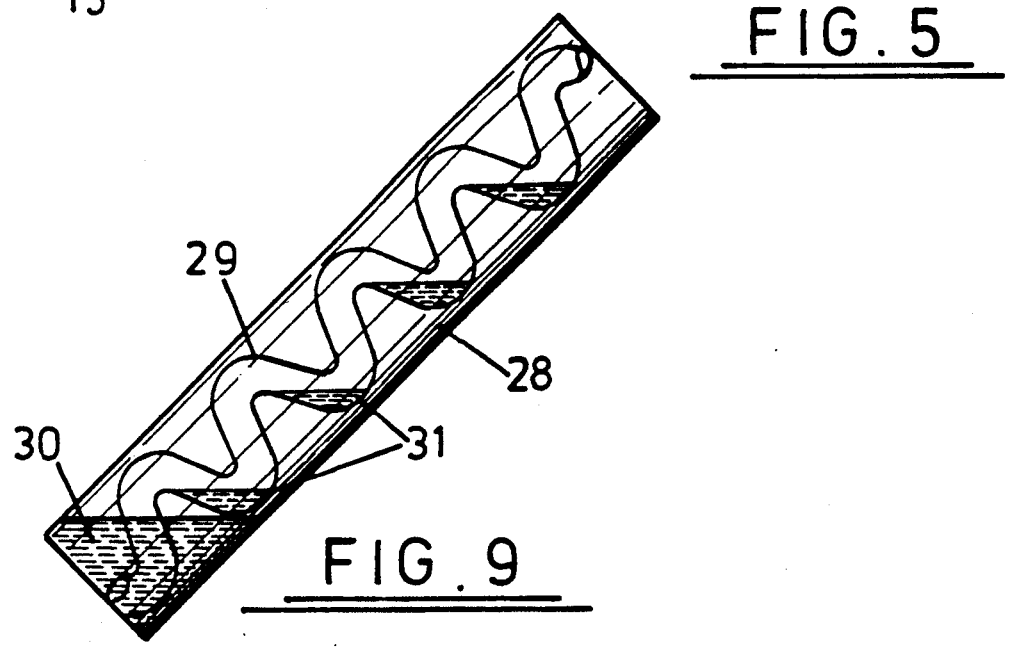
FIG.9

DISPLAY APPARATUS

FIELD OF THE INVENTION

The present invention relates to a display apparatus, and particularly to a display apparatus suitable for illustrating the operation of an Archimedes screw.

BACKGROUND OF THE INVENTION

The Archimedes screw is a well known device originally designed for the purpose of raising water. Such a device generally comprises a rotating broad-threaded screw or spirally bent tube positioned within an inclined hollow cylinder. The screw or tube is turned within and about the axis of the cylinder with the bottom of the cylinder immersed in the liquid to be raised and the top of the cylinder open. A portion of the liquid is then trapped between adjacent turns of the screw or tube as a result of the inclination of the supporting cylinder and the entrapped liquid is transported up the cylinder and discharged from the upper end of the cylinder.

The basic operation of the Archimedes screw has been known for thousand of years but its operation is difficult to illustrate graphically. It is an object of the present invention to provide a display apparatus which can clearly and conveniently illustrate the operation of an Archimedes screw.

SUMMARY OF THE INVENTION

According to the present invention there is provided a display apparatus defining a passageway within which a body of fluid may be retained, wherein the passageway comprises an elongate first passage and an helical second passage which is connected to an extends between the ends of the first passage, the walls of at least the second passage being transparent, and the second passage being formed such that if the first passage is positioned with a predetermined inclination to the vertical, fluid can be transferred through the second passage from the lower to the upper end of the first passage by rotating the apparatus about an axis extending parallel to the length of the first passage.

The word "helical" is used herein without any precise mathematical significance and is intended to cover any spiral formation capable of being used in an apparatus operating in the manner of an Archimedes screw.

The helical second passage may extend around the first passage or alternatively may be enclosed within the first passage. In the latter case the wall of the first passage must itself be transparent to enable the flow of liquid through the second passage to be seen.

The second passage may be defined by a tube wound around the first passage and that tube may be in form of a closed loop. The closed loop of tube may be received within a cylindrical casing.

At least one end of the first passage may communicate with a cavity extending beyond an adjacent end of the second passage to provide a space to receive unwanted bubbles or the like.

In an alternative arrangement the first passage may be defined by a first tube located coaxially within a second tube, the first tube communicating with opposite ends of the second tube, and a helical web being disposed between the first and second tubes to define with the tubes the said second passage.

The passageway may be partially filled with a single liquid, for example colored water, or the passageway may be substantially fully filled with at least two immiscible liquids of different densities and different optical properties, e.g. different colors.

The apparatus is preferably mounted on a rotatable spindle supported by a suitable base.

BRIEF DESCRIPTION OF THE DRAWINGS

Embodiments of the present invention will now be described, by way of example, with reference to the accompanying drawings, in which:

FIGS. 4 and 5 illustrate further embodiments of the invention similar to the embodiment of FIG. 2;

FIG. 9 illustrates a further embodiment of the invention.

DESCRIPTION OF THE PREFERRED EMBODIMENT

Figures 1, 2, 3:
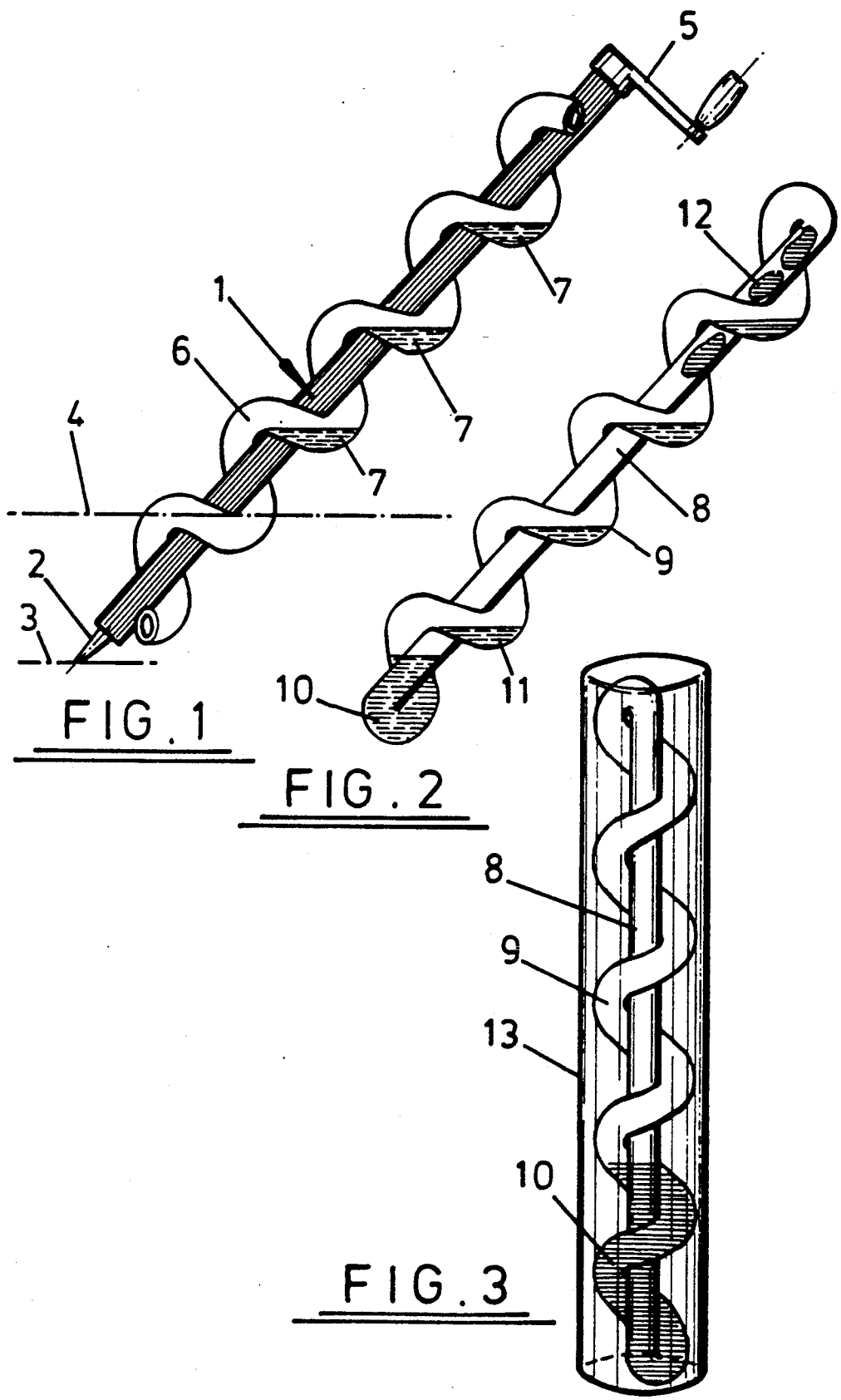
FIG. 1 is a schematic illustration of a conventional Archimedes screw.
FIG. 2 illustrates a closed loop embodying the present invention.
FIG. 3 illustrates the tube of FIG. 2 mounted within a cylindrical casing.

Referring to FIG. 1, this illustrates a conventional Archimedes screw structure comprising a central solid shaft 1 supported on a point 2 resting on a surface 3 located beneath the surface 4 of a body of water. A handle 5 is connected to the upper end of the shaft 1 and may be used to rotate the shaft about its longitudinal axis.

A helical tube 6 is wound around the shaft 1. The upper and lower ends of the tube are open and thus the bottom turn of the tube is always filled with water to the level 4. As the shaft is rotated however small volumes of water are entrapped between adjacent turns of the tube. These entrapped volumes of water are indicated by numerals 7. As the tube is rotated these volumes of water are elevated and finally discharged from the other end of the tube.

Thus the Archimedes screw structure can be used to elevate water providing the angle of inclination of the shaft 1 and the pitch of the tube 6 are appropriately inter-related.

Referring now to FIG. 2, this illustrates a first embodiment of the present invention. The illustrated embodiment comprises a closed loop tube defining a closed passageway made up of a first straight passage 8 and helical second passage 9 which is wound around the first passage 8. A body of water or other liquid is retained within the passageway defined by the interconnecting passages 8 and 9. If the assembly is positioned with the axis of the first passage 8 inclined to the vertical as shown in FIG. 2 and the assembly then rotates about the axis of the first passage 8 bodies of liquid 11 travel along the second passage 9 until they enter the upper end of the first passage 8 and return under the force of gravity to the bottom of the first passage 8 in the form of droplets 12. Thus a closed system is provided which enables a liquid such as water to be transported in the manner of an Archimedes screw. The passageway is entirely closed and therefore the principal of operation of an Archimedes screw can be demonstrated without requiring any external source of liquid or risking any spillage of liquid.

In order to enable the Movement of liquid through the passageway to be seen it is necessary for at least the second helical passageway 9 to be to be transparent and preferably both passages 8 and 9 are transparent. It is also advantageous if the liquid has optical properties which make it easy to see. This can be achieved by using for example colored water or the like.

A single body of liquid may be placed within the passageway but alternatively substantially the whole volume of the passageway can be filled with two immiscible liquids which have different densities and different optical qualities.

As shown in FIG. 3, the assembly illustrated in FIG. 2 may be mounted within a cylindrical transparent casing 13. Such an arrangement makes it easier to manipulate the apparatus and makes it possible to stand the apparatus on a table when it is not in use.

Referring now to FIG. 4, this illustrates an arrangement similar to that of FIGS. 2 and 3 and the same reference numerals are used where appropriate. In the embodiment of FIG. 4 however each end of the first passage 8 communicates with a blind cavity 14 which is in effect an extension of the first passage 8. The cavity 8 is closed by a simple end cap 15, the end cap 15 at the upper end of the being shown displaced from the end of the cavity 14. Alternatively a plug (not shown) could be provided rather than an end cap. Removal of the end cap or plug enables the introduction of a liquid or liquids into the passageway defined by the first and second passages 8 and 9. In FIG. 4, the line 16 indicates the level to which the passageway has been filled by two liquids that is a relatively dense liquid bodies 11 of which are shown entrapped between coils of the second passage 9 and a lighter transparent liquid the presence of which is only indicated by the level 16. The provision of the cavities 14 ensures that if bubbles of gas are retained within the passageway they become trapped in the upper cavity 14 and therefore do not affect the appearance of or the operation of the device. Furthermore the provision of a gas filled space at the upper end of the passageway provides a space for receiving any expansion of the liquid due to for example heating.

Referring to FIG. 5, this shows an alternative arrangement similar to that of FIG. 4 but with the device enclosed within the cylindrical casing 17 and with only one end cavity 14. To assist in manufacture, an arrangement such as that shown in FIG. 4 could be made from a single length of transparent plastics tubing with the end of the helical portion straightened to extend parallel to the central straight portion. The two ends of the tube could then be interconnected by pushing on a simple cap which defines inverted U-shaped passage extending between sockets arranged to receive tube ends. The U-shaped passage could incorporate a cavity to receive trapped gas bubbles. A closed loop structure of the type shown in FIG. 3, a single cavity structure of the type shown in FIG. 5 or a double cavity structure of the type shown in FIG. 4 can be selected on the basis of manufacturing convenience and appearance.

Figure 6:
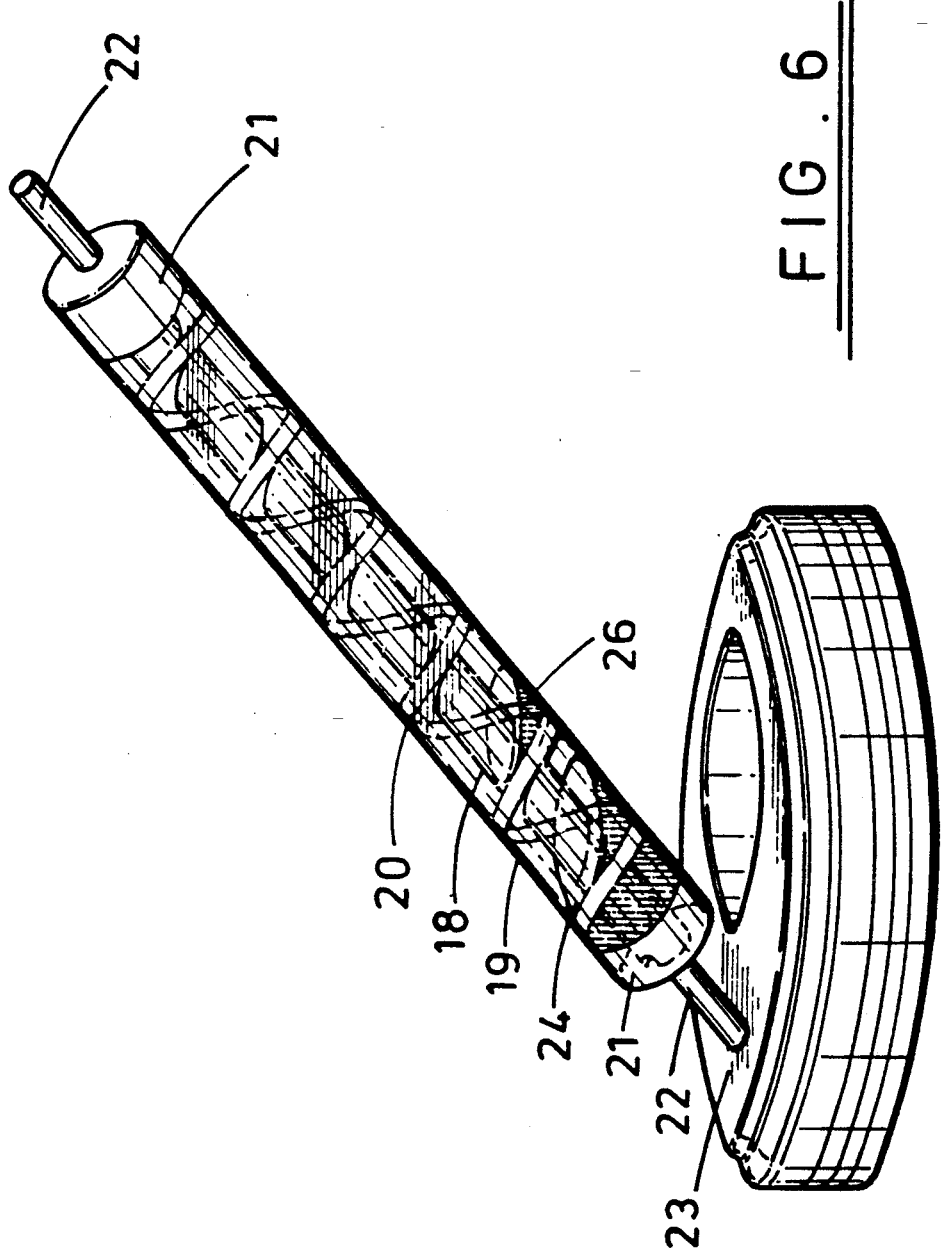
FIG. 6 illustrates a further embodiment of the invention mounted on a support block.

Referring now to FIG. 6, this shows an alternative way of forming the helical second passage. In the arrangement of FIG. 6 which is shown in section FIG. 7, a first passage is defined by a first inner tube 18 and a second passageway is defined between the inner tube 18 and an outer tube 19. A helical web of material forms a helical screws 20 in the space between the tubes 18 and 19. The tubes 18 and 19 are retained in position by end caps 21 from which spindles 22 project. The lower spindle 22 is received in a support block 23 such that the apparatus is readily rotatable relative to the support block 23 by twisting the upper spindle 22 between the fingers.

A body of liquid 24 is introduced into the passageway and collects at the bottom of the tubes 18 and 19. As can be seen from FIG. 7, a portion 25 of each end of the inner tube 18 is removed such that the first and second passages communicate. Rotation of the apparatus about the axis of the spindles 22 causes portions 26 of the liquid 24 to be entrapped and transported through the helical second passage defined between the tubes 18 and 19 until they are discharged into the upper end of the inner tube 18 for return to the base of the device.

Figure 7:
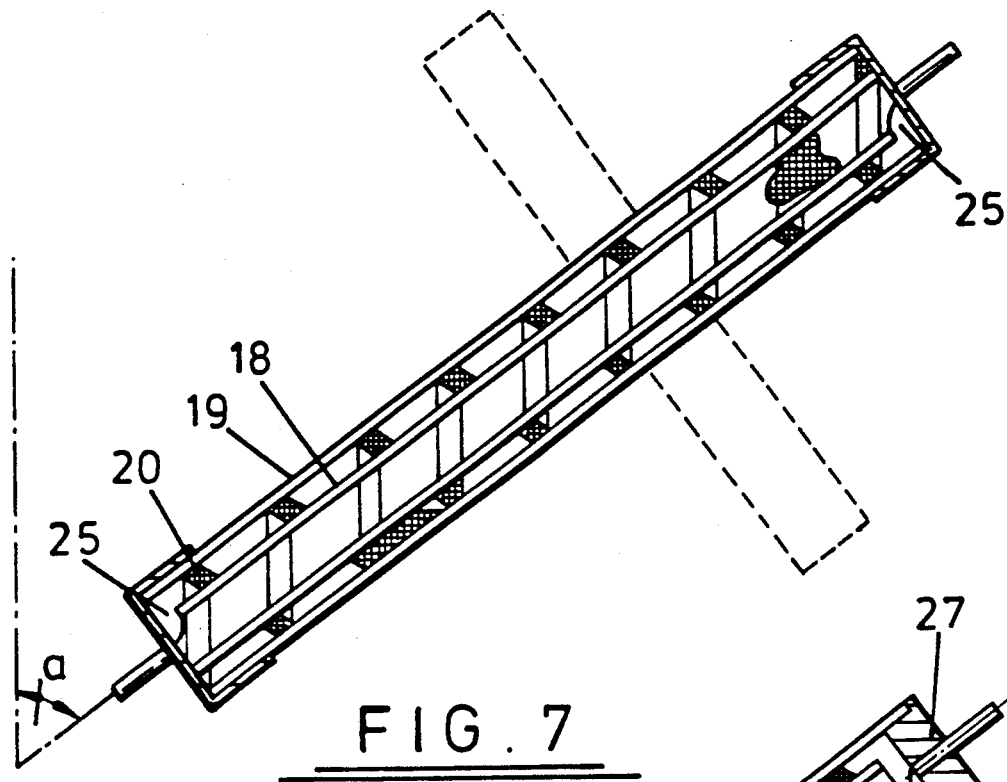
FIG. 7 is an axial section through the embodiment of FIG. 6.

As before, a single liquid or two immiscible liquids of different colors can be used. The outer tube 19 must be transparent and the inner tube 18 is preferably transparent. As shown in FIG. 7, the axis of the tubes is arranged at an angle a to the vertical and the angle subtended by adjacent turns of the helix is indicated as angle b. The device will perform as an Archimedes screw providing the angle b is less than twice the angle a.

Figure 8:
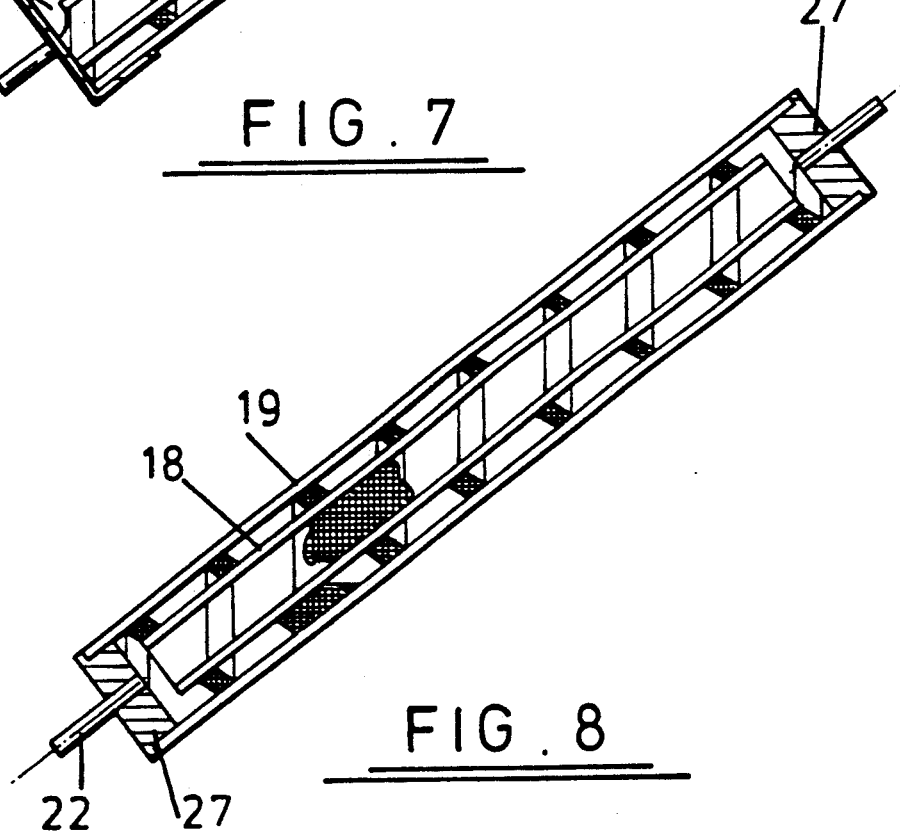
FIG. 8 is a view similar to that of FIG. 7 through a further embodiment of the invention.

Referring now to FIG. 8, this illustrates a very similar arrangement to that illustrated in FIGS. 6 and 7, the only substantial difference being that in the arrangement of FIG. 8 plugs 27 are provided to close the ends of the outer tube 19 rather than the end caps 25 shown in FIG. 7. In addition in the arrangement of FIG. 8 the inner tube 18 stops short of the end plugs 27 to provide the necessary communication between the interior and exterior of the tube 18.

Referring not to FIG. 9, this shows an alternative arrangement of the invention in which a first passage is defined by a cylinder 28 and a second passage is defined by a helical tube 29 that is received within the cylinder 28. The inner wall of the cylinder 28 is spaced from the radially outer surface of the helical tube to enable liquid to flow freely along the cylinder 28. The ends of the tube 29 are open and therefore communicate with the interior of the cylinder 28. A body of liquid 30 is provided within the assembly such that rotation of the device about the longitudinal axis of the cylinder 28 enables bodies of liquid 31 to be transported along the length of the second passageway. Thus the embodiment can operate in exactly the same manner as the previously described embodiments although the return flow of liquid is not constrained within a tube inside the coils of the helix. It will be appreciated of course that both the cylinder 28 and the tube 29 must be transparent if the movement of the liquid within the tube 29 is to be viewed. It will also be appreciated that the arrangement of FIG. 9 can be considered to be a more accurate representation of a traditional Archimedes screw as liquid falls from the end of the helical passage rather than passing directly into an axial return passageway.

It will be appreciated that embodiments for the present invention may be used for the purposes of education or to provide a visually appealing toy for children or adults. It will also be appreciated that rotation of the helix may be achieved either manually as described above or by using a separate power source, for example a small electric motor which could be housed in a support base of the type shown in FIG. 6. It will also be appreciated that the simple tubular structures illustrated in the accompanying drawings could be supplemented by extra components, for example a wheel-like component of the type shown in outline by broken lines in FIG. 7. The wheel member would be symmetrical about the longitudinal axis of the structure and would provide an easy means for causing rotation of the assembly about the longitudinal axis.

Reference is made above to various components of the described apparatus being "transparent". The word "transparent" is used herein to indicate that the motion of fluid behind the "transparent" component can be seen clearly. It could be that the "transparent" component is colored or transmits rays of light with some diffusion.

I claim:

1. A display apparatus defining a passageway within which a body of fluid may be retained, wherein the passageway comprises a closed loop including an elongate first passage and a helical second passage which is connected to and extends between the ends of the first passage, the walls of at least the second passage being transparent, and the second passage being formed such that if the first passage is positioned with a predetermined inclination to the vertical, fluid can be transferred through the second helical passage from the lower to the upper end of the first passage by rotating the apparatus about an axis extending parallel to the length of the first passage.

2. An apparatus according to claim 1, wherein the helical second passage extends around the first passage.

3. An apparatus according to claim 2 wherein the second passage is defined by a tube wound around the first passage.

4. An apparatus according to claim 3, wherein the passageway is defined by a closed loop of tube defining the first and second passageways.

5. An apparatus according to claim 4, wherein the closed loop of tube is received within a cylindrical casing.

6. An apparatus according to claim 4, wherein at least one end of the first passage communicates with a cavity extending beyond an adjacent end of the second passage.

7. An apparatus according to claim 2, wherein the first passage is defined by a first tube located coaxially within a second tube, the first tube communicating with opposite ends of the second tube, and a helical web is disposed between the first and second tubes to define with the tubes the said second passageway.

8. An apparatus according to claim 1, wherein the second passage is enclosed within the first passage.

9. An apparatus according to claim 1, wherein the passage way is partially filled with a liquid.

10. An apparatus according to claim 1, wherein the passageway is substantially fully filled with at least two immiscible liquids of different densities and different optical properties.

11. An apparatus according to claim 1 comprising a spindle aligned with the said axis and mounted on a support to enable rotation of the passageway about the said axis.

* * * * *